US011708042B2

(12) United States Patent
Meador et al.

(10) Patent No.: US 11,708,042 B2
(45) Date of Patent: Jul. 25, 2023

(54) SEATBELT SYSTEM WITH INFLATABLE CUSHIONS

(71) Applicant: Autoliv ASP, Inc., Ogden, UT (US)

(72) Inventors: Benjamin Lee Meador, Lake Orion, MI (US); Jacob William Werth, Lake Orion, MI (US); Kevin Hixenbaugh, Flushing, MI (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 17/204,809

(22) Filed: Mar. 17, 2021

(65) Prior Publication Data

US 2022/0297626 A1 Sep. 22, 2022

(51) Int. Cl.
| | | |
|---|---|---|
| *B60R 21/18* | (2006.01) | |
| *B60R 21/231* | (2011.01) | |
| *B60R 22/12* | (2006.01) | |
| *B60R 22/18* | (2006.01) | |
| *B60R 22/28* | (2006.01) | |
| *B60R 21/00* | (2006.01) | |
| *B60R 22/02* | (2006.01) | |

(52) U.S. Cl.
CPC ............ *B60R 21/18* (2013.01); *B60R 21/231* (2013.01); *B60R 22/12* (2013.01); *B60R 22/18* (2013.01); *B60R 22/28* (2013.01); *B60R 2021/0048* (2013.01); *B60R 2021/23107* (2013.01); *B60R 2022/027* (2013.01)

(58) Field of Classification Search
CPC ..... B60R 21/18; B60R 21/231; B60R 21/207; B60R 22/12; B60R 22/18; B60R 22/28; B60R 2021/0048; B60R 2021/23107; B60R 2021/23146; B60R 2022/027

USPC .......................................... 280/733; 297/484
See application file for complete search history.

(56) References Cited

U.S. PATENT DOCUMENTS

| | | | |
|---|---|---|---|
| 2,873,122 | A | 2/1959 | Peras |
| 3,623,768 | A | 11/1971 | Capener et al. |
| 3,795,412 | A | 3/1974 | John |

(Continued)

FOREIGN PATENT DOCUMENTS

| | | |
|---|---|---|
| CN | 104925112 | 9/2015 |
| CN | 106335460 | 1/2017 |

(Continued)

OTHER PUBLICATIONS

DE202018104187, Machine Translation, (12 pgs).

(Continued)

*Primary Examiner* — Keith J Frisby
(74) *Attorney, Agent, or Firm* — Matthew D. Thayne; Thayne and Davis LLC

(57) ABSTRACT

Vehicle safety systems comprising seatbelts and inflatable cushions deployable therefrom. Some embodiments comprise a first vertical seatbelt having a first inflatable cushion coupled thereto and a second vertical seatbelt having a second inflatable cushion coupled thereto. The first inflatable cushion and the second inflatable cushion may be configured to inflate at an at least substantially static location relative to an adjacent seat and may be configured to deploy adjacent to an occupant's chest and to inhibit movement of an occupant's head during an impact event. The system may further comprise a horizontal seatbelt coupled with one or both of the first vertical seatbelt and the second vertical seatbelt.

19 Claims, 4 Drawing Sheets

(56) References Cited

U.S. PATENT DOCUMENTS

| | | | |
|---|---|---|---|
| 5,505,487 A | 4/1996 | Brown et al. | |
| 5,758,900 A * | 6/1998 | Knoll | B60R 21/18 |
| | | | 280/733 |
| 7,938,447 B2 | 5/2011 | Miyagawa | |
| 8,585,084 B1 | 11/2013 | Schneider | |
| 9,108,584 B2 | 8/2015 | Rao et al. | |
| 9,434,339 B2 | 9/2016 | Witt et al. | |
| 9,446,735 B1 | 9/2016 | Jayasuriya et al. | |
| 9,517,744 B2 | 12/2016 | Shimazu | |
| 9,533,651 B1 | 1/2017 | Ohno et al. | |
| 9,550,514 B2 | 1/2017 | Schulz | |
| 9,573,553 B2 | 2/2017 | Ko et al. | |
| 9,738,252 B1 * | 8/2017 | Shoda | B60R 22/34 |
| 9,744,932 B1 | 8/2017 | Faruque et al. | |
| 9,744,933 B1 | 8/2017 | Rao et al. | |
| 9,758,127 B1 | 9/2017 | Farooq et al. | |
| 9,789,840 B2 | 10/2017 | Farooq et al. | |
| 9,802,566 B2 | 10/2017 | Engelman et al. | |
| 9,821,681 B2 | 11/2017 | Rao et al. | |
| 9,827,939 B1 | 11/2017 | Roychoudhury et al. | |
| 9,828,016 B2 | 11/2017 | Lubischer et al. | |
| 9,840,279 B2 | 12/2017 | Abbas et al. | |
| 9,994,181 B1 | 6/2018 | Dubaisi et al. | |
| 9,994,182 B1 | 6/2018 | Jaradi et al. | |
| 10,112,570 B2 | 10/2018 | Barbat et al. | |
| 2003/0168837 A1 * | 9/2003 | Schneider | B60R 21/18 |
| | | | 280/733 |
| 2010/0156084 A1 * | 6/2010 | Nezaki | B60R 22/46 |
| | | | 280/806 |
| 2012/0101688 A1 * | 4/2012 | Sugiyama | B60R 21/18 |
| | | | 701/45 |
| 2017/0174203 A1 | 6/2017 | Brown et al. | |
| 2017/0210329 A1 | 7/2017 | Rao et al. | |
| 2017/0225641 A1 | 8/2017 | Faruque et al. | |
| 2017/0253192 A1 | 9/2017 | Faist et al. | |
| 2017/0259774 A1 | 9/2017 | Matsushita et al. | |
| 2017/0361802 A1 | 12/2017 | Farooq et al. | |
| 2018/0065585 A1 | 3/2018 | Jaradi et al. | |
| 2018/0086297 A1 | 3/2018 | Bodtker et al. | |
| 2018/0099705 A1 | 4/2018 | Faruque et al. | |
| 2018/0162310 A1 | 6/2018 | Szawarski et al. | |
| 2018/0186324 A1 | 7/2018 | Faruque et al. | |
| 2018/0208142 A1 | 7/2018 | Barbat et al. | |
| 2018/0208143 A1 | 7/2018 | Fischer et al. | |
| 2018/0222432 A1 | 8/2018 | Schneider | |
| 2018/0251096 A1 | 9/2018 | Fischer et al. | |
| 2019/0016288 A1 | 1/2019 | Schneider | |
| 2019/0031132 A1 | 1/2019 | Dry et al. | |
| 2019/0031133 A1 | 1/2019 | Dry et al. | |
| 2019/0054884 A1 | 2/2019 | Dry et al. | |

FOREIGN PATENT DOCUMENTS

| | | |
|---|---|---|
| CN | 205854253 | 1/2017 |
| CN | 106379402 | 2/2017 |
| CN | 106741117 | 5/2017 |
| CN | 107150713 | 9/2017 |
| DE | 19859988 | 12/1998 |
| DE | 19745154 | 4/1999 |
| DE | 102012221533 | 11/2012 |
| DE | 102013200667 | 1/2013 |
| DE | 102013015209 | 9/2013 |
| DE | 102016001257 | 4/2016 |
| DE | 102017003344 | 4/2017 |
| DE | 102017001062 | 7/2017 |
| DE | 202017105444 | 9/2017 |
| DE | 102017006592 | 12/2017 |
| DE | 102018001991 | 3/2018 |
| DE | 202018103017 | 5/2018 |
| DE | 202018104187 | 7/2018 |
| EP | 2699454 | 4/2011 |
| EP | 2799290 | 11/2014 |
| EP | 3536563 | 11/2019 |
| WO | 201833569 | 2/2018 |
| WO | 201878740 | 3/2018 |
| WO | 2018114723 | 6/2018 |
| WO | 2018172456 | 9/2018 |

OTHER PUBLICATIONS

DE02018103017, Machine Translation, (8 pgs).
CN104925112, Machine Translation, (12 pgs).
WO201878740, Machine Translation, (18 pgs).
DE19859988, Machine Translation, (13 pgs).
DE102012221533, Machine Translation, (11 pgs).
DE1020132006667, Machine Translation, (11 pgs).
DE102017006592, Machine Translation, (11 pgs).
DE102018001991, Machine Translation, (8 pgs).
DE102017001062, Machine Translation, (11 pgs).
DE102016001257, Machine Translation, (8 pgs).
DE102017003344, Machine Translation, (8 pgs).
WO201833569, Machine Translation, (12 pgs).
WO2018172456, Machine Translation, (9 pgs).
DE20201710544, Machine Translation, (21 pgs).
CN106741117, Machine Translation, (8 pgs).
CN205854253, Machine Translation, (14 pgs).
CN106379402, Machine Translation, (19 pgs).
CN106335460, Machine Translation, (12 pgs).
CN107150713, Machine Translation, (15 pgs).
DE102013015209, Machine Translation, (22 pgs).

* cited by examiner

SEATBELT SYSTEM WITH INFLATABLE CUSHIONS

SUMMARY

Reducing neck injuries during vehicle crashes is of critical importance but provides unique challenges in vehicle safety systems. HANS devices are sometimes used in connection with race cars to reduce head and neck injuries, but these devices are bulky, uncomfortable, typically work in conjunction with a helmet, and are largely unsuitable for use in connection with everyday driving. Incorporation of inflatable cushions in seatbelts has also been utilized. However, due to varying deployment locations depending upon occupant size, previous systems have been unable to provide full coverage and protection for a large range of occupant sizes.

The present inventors have therefore determined that it would be desirable to provide apparatus, systems and methods that overcome one or more of the foregoing limitations and/or other limitations of the prior art. In some embodiments, the inventive concepts disclosed herein may therefore provide a vehicle safety system utilizing both seatbelts and inflatable cushions in a "backpack"-style configuration. In preferred embodiments, two vertical seatbelts with low outboard seat track mounted retractors are provided. The belts may extend to the top and/or rear portion of the seat, preferably slightly inboard of the retractors, where they may be anchored, in some embodiments along with an inflator. A horizontal seatbelt may be coupled with the inboard vertical belt and, in some embodiments, may directly attach to at least one of the outer vertical seatbelts.

The system may be similar to backpack in use and may be configured to automatically retract for comfort. Preferably, an occupant can put the system in place using a single hand to connect the lap belt and secure the entire system in place. The lap belt connecting the two vertical seatbelts may comprise a polyblock (inboard vehicle) to allow the lap belt to stay low over the pelvis and latch onto the outboard strap while the vertical belt still can extract/retract. This may allow for increasing the load on an occupant's shoulders and/or pelvis compared to across the entire chest.

In some embodiments, neck injury may be reduced by providing inflatable cushions that may be deployed from one or both vertical seatbelts. In some embodiments, one or more such cushions may be configured to inflate along the occupant's chest similar to a tuxedo collar to engage the occupant's neck and impede tucking in forward motion (similar to a HANS device). In some embodiments, one or more additional inflatable cushions may deploy adjacent to the occupant's shoulders and/or neck to stabilize the neck during side impacts, ODB, SOL, and/or OOL testing. This cushion or cushions may help control the neck to react more consistently during a wide variety of crashes.

Unlike other known solutions, preferably the location of one or more of the cushions' deployment is static, which allows for better coverage on all sized occupants. In embodiments utilizing a four-point base, the loading may be more even compared to three-point bases, which may allow a shoulder to rotate and may result in the occupant's head burrowing in between curtain and front (DAB/PAB) airbag cushions when front collisions with offset occur.

In a more particular example of a vehicle safety system according to some embodiments, the system may comprise a first vertical seatbelt, a first inflatable cushion coupled with the first vertical seatbelt, a second vertical seatbelt, and a second inflatable cushion coupled with the second vertical seatbelt. The first inflatable cushion and the second inflatable cushion may be configured to inflate at an at least substantially static location relative to an adjacent seat. The first inflatable cushion and the second inflatable cushion may further be configured to deploy adjacent to an occupant's chest and to inhibit movement of an occupant's head during an impact event. The system may further comprise a horizontal seatbelt coupled with at least one of the first vertical seatbelt and the second vertical seatbelt.

In some embodiments, one or both of the first vertical seatbelt and the second vertical seatbelt may be configured to retract from a bottom portion of the respective vertical seatbelt.

In some embodiments, the horizontal seatbelt may be coupled with both the first vertical seatbelt and the second vertical seatbelt. In some embodiments, the horizontal seatbelt may be retractably coupled to one or both of the first vertical seatbelt and the second vertical seatbelt.

Some embodiments may further comprise a third inflatable cushion configured to inflate adjacent to the occupant's neck and to inhibit lateral movement of the occupant's head during an impact event. In some such embodiments, a fourth inflatable cushion may be provided, which may be configured to inflate adjacent to the occupant's neck on a side of the occupant's neck opposite from the third inflatable cushion and to inhibit lateral movement of the occupant's head during a side impact event.

In some embodiments, one or both of the first vertical seatbelt and the second vertical seatbelt may comprise a latch mechanism for receiving a tongue of the horizontal seatbelt. In some such embodiments, the latch mechanism may be slidable within the at least one of the first vertical seatbelt and the second vertical seatbelt.

In another example of a vehicle safety system according to some embodiments, the system may comprise a first vertical seatbelt and a second vertical seatbelt. A horizontal seatbelt may be coupled with one or both of the first vertical seatbelt and the second vertical seatbelt. A first inflatable cushion may be coupled with at least one of the first vertical seatbelt and the second vertical seatbelt, wherein the first inflatable cushion is configured to deploy adjacent to an occupant's chest and to inhibit forward movement of an occupant's head during an impact event. A second inflatable cushion may be coupled with at least one of the first vertical seatbelt and the second vertical seatbelt, wherein the second inflatable cushion is configured to deploy adjacent to the occupant's neck and to inhibit lateral movement of the occupant's head during an impact event.

In some embodiments, the first inflatable cushion may be coupled with the first vertical seatbelt and a third inflatable cushion may be coupled with the second vertical seatbelt, which third inflatable cushion may be configured to deploy adjacent to the occupant's chest on a side of the occupant's chest opposite from the first inflatable cushion.

In some embodiments, the second inflatable cushion may be coupled with the first vertical seatbelt. Some embodiments may further comprise a fourth inflatable cushion coupled with the second vertical seatbelt. The fourth inflatable cushion may be configured to deploy adjacent to the occupant's neck on a side of the occupant's neck opposite from the second inflatable cushion.

Some embodiments may further comprise anchor mechanisms for anchoring one or both of the vertical seatbelts to a vehicle seat or another suitable location. For example, some embodiments may comprise a first anchor mechanism coupled to the first vertical seatbelt and configured to be coupled to a vehicle seat and a second anchor mechanism coupled to the second vertical seatbelt and configured to be coupled to the vehicle seat. In some embodiments, one or both of the first anchor mechanism and the second anchor mechanism may comprise a load limiting mechanism configured to allow the first vertical seatbelt and the second vertical seatbelt to extend from their respective anchor mechanisms slightly during an impact event.

In an example of a vehicle according to some embodiments, the vehicle may comprise a seat having a first vertical seatbelt anchored to an upper portion of the seat. The system may further comprise a second vertical seatbelt anchored to an upper portion of the seat. One or both of the first vertical seatbelt and the second vertical seatbelt may be retractably coupled to the seat at a lower portion of the seat, such as by providing a retraction mechanism. A lap seatbelt may be coupled with one or both of the first vertical seatbelt and the second vertical seatbelt. A first inflator may be operably coupled with the first vertical seatbelt and may be configured to inflate a first inflatable cushion configured to deploy from the first vertical seatbelt. Similarly, a second inflator may be operably coupled with the second vertical seatbelt and may be configured to inflate a second inflatable cushion configured to deploy from the second vertical seatbelt.

In some embodiments, both the first vertical seatbelt and the second vertical seatbelt may be retractably coupled to the seat at respective lower portions of the seat.

Some embodiments may further comprise a first load limiting mechanism coupled with the first vertical seatbelt and configured to allow the first vertical seatbelt to extend from a first anchor point at which the first vertical seatbelt is anchored to the upper portion of the seat during an impact event. Some embodiments may further comprise a second load limiting mechanism coupled with the second vertical seatbelt and configured to allow the second vertical seatbelt to extend from a second anchor point at which the second vertical seatbelt is anchored to the upper portion of the seat during an impact event. Preferably the load limiting mechanism(s) does not allow for such retraction other than during an impact event.

In some embodiments, the anchor points and/or load limiting mechanisms may also be configured to receive and/or mount an inflator. Thus, in some embodiments, the first inflator may be coupled with the first load limiting mechanism and/or the second inflator may be coupled with the second load limiting mechanism.

In some embodiments, both the first vertical seatbelt and the second vertical seatbelt may be non-releasably coupled at both opposing ends to the seat such that no manual coupling or recoupling of the first vertical seatbelt or the second vertical seatbelt is required during use. Instead, for example, only a single coupling of a lap/horizontal seatbelt may be required by, for example, inserting a buckle tongue into a single buckle to accomplish such coupling.

Some embodiments may further comprise a third inflatable cushion coupled with the first vertical seatbelt. The third inflatable cushion may be configured to deploy adjacent to a neck of an occupant in the seat and to inhibit lateral movement of the occupant's head during an impact event, such as side impact events. Some embodiments may further comprise a fourth inflatable cushion coupled with the second vertical seatbelt. Similar to the third inflatable cushion, the fourth inflatable cushion may be configured to deploy adjacent to the occupant's neck on a side of the occupant's neck opposite from the third inflatable cushion and to inhibit lateral movement of the occupant's head during a side impact event or another impact event.

The features, structures, steps, or characteristics disclosed herein in connection with one embodiment may be combined in any suitable manner in one or more alternative embodiments.

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION

A detailed description of apparatus, systems, and methods consistent with various embodiments of the present disclosure is provided below. While several embodiments are described, it should be understood that the disclosure is not limited to any of the specific embodiments disclosed, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

As used herein, the term "substantially" refers to the complete or nearly complete extent or degree of an action, characteristic, property, state, structure, item, or result to function as indicated. For example, an object that is "substantially" cylindrical or "substantially" perpendicular would mean that the object/feature is either cylindrical/perpendicular or nearly cylindrical/perpendicular so as to result in the same or nearly the same function. The exact allowable degree of deviation provided by this term may depend on the specific context. The use of "substantially" is equally applicable when used in a negative connotation to refer to the complete or near complete lack of an action, characteristic, property, state, structure, item, or result. For example, structure which is "substantially free of" a bottom would either completely lack a bottom or so nearly completely lack a bottom that the effect would be effectively the same as if it completely lacked a bottom.

Similarly, as used herein, the term "about" is used to provide flexibility to a numerical range endpoint by providing that a given value may be "a little above" or "a little below" the endpoint while still accomplishing the function associated with the range.

The embodiments of the disclosure may be best understood by reference to the drawings, wherein like parts may be designated by like numerals. It will be readily understood that the components of the disclosed embodiments, as generally described and illustrated in the figures herein, could be arranged and designed in a wide variety of different configurations. Thus, the following detailed description of the embodiments of the apparatus and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified. Additional details regarding certain preferred embodiments and implementations will now be described in greater detail with reference to the accompanying drawings.

Figure 1:
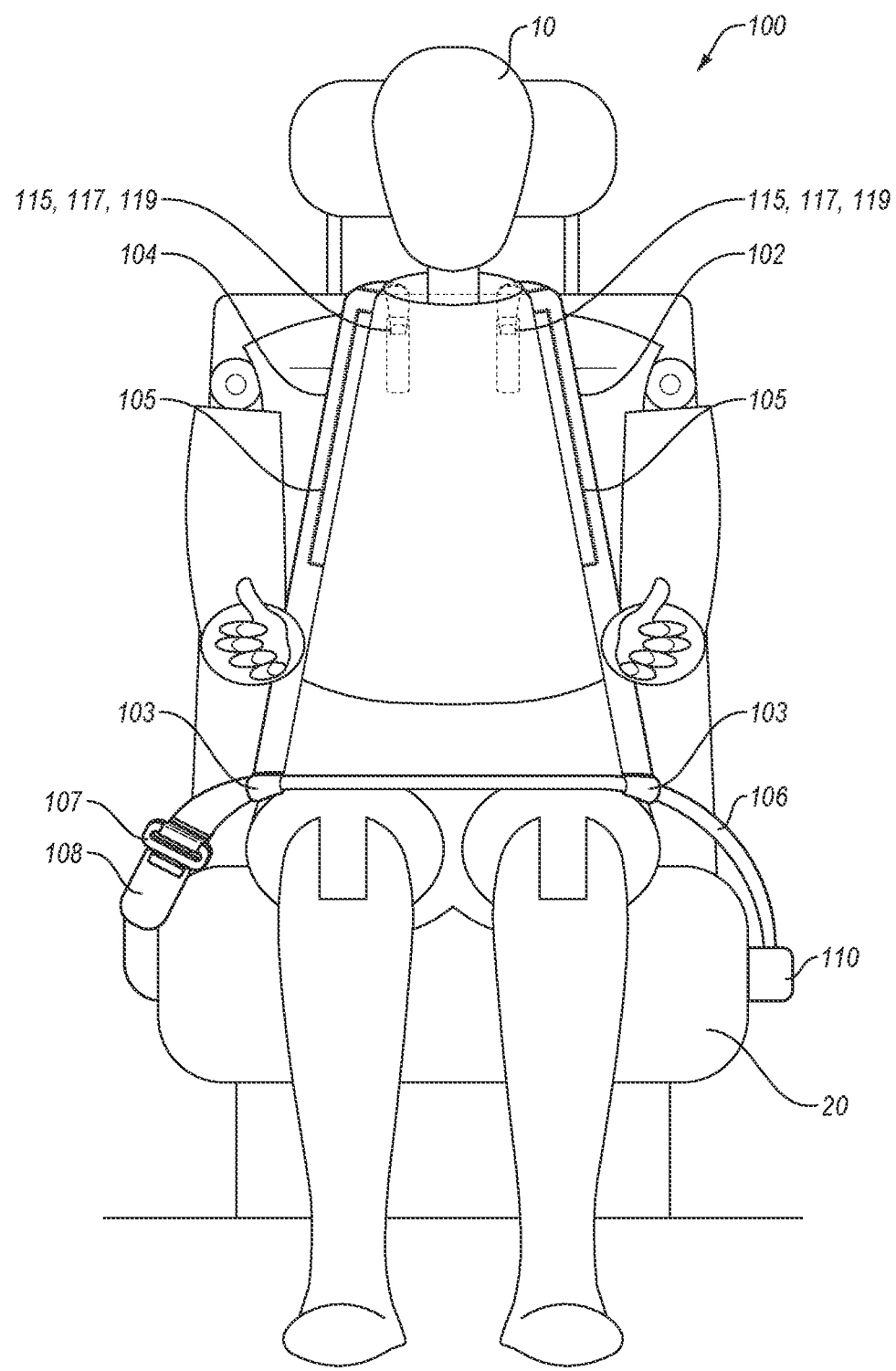
FIG. 1 illustrates an example of a vehicle safety system comprising both seatbelts and inflatable cushions according to some embodiments.

FIG. 1 depicts a vehicle safety system 100 according to some embodiments. Vehicle safety system 100 comprises both seatbelt restraints and inflatable cushions. More particularly, system 100 comprises a first vertical seatbelt 102 and a second vertical seatbelt 104. Seatbelts 102 and 104 are preferably configured to be positioned on an occupant 10 similar to a backpack and more preferably such that an occupant 10 can use a single hand to connect.

A horizontal or lap seatbelt 106 is coupled with both of the vertical seatbelts 102 and 104. However, it is contemplated that, in alternative embodiments, horizontal seatbelt 106 may only be coupled with one of the vertical seatbelts 102 and 104. In some embodiments, horizontal seatbelt 106 may be slidably or otherwise moveably coupled with both vertical seatbelts 102/104, such as by providing slidable clips 103, loops, or the like. In some embodiments, horizontal seatbelt 106 may simply slide over or through a portion of one or both of vertical seatbelts 102/104.

Horizontal seatbelt 106 comprises a buckle tongue 107 that may be received in a buckle 108. In some embodiments, horizontal seatbelt 106 may further be coupled with a retractor 110. However, in other embodiments, retractor 110 may instead comprise a fixed mount and seatbelt 106 need not be retractable, as discussed below in connection with other depicted embodiments. In fact, it may be preferred to have only the vertical seatbelts 102 and 104 be retractably coupled with retraction mechanisms, as this may provide a more even payout.

Figure 2:
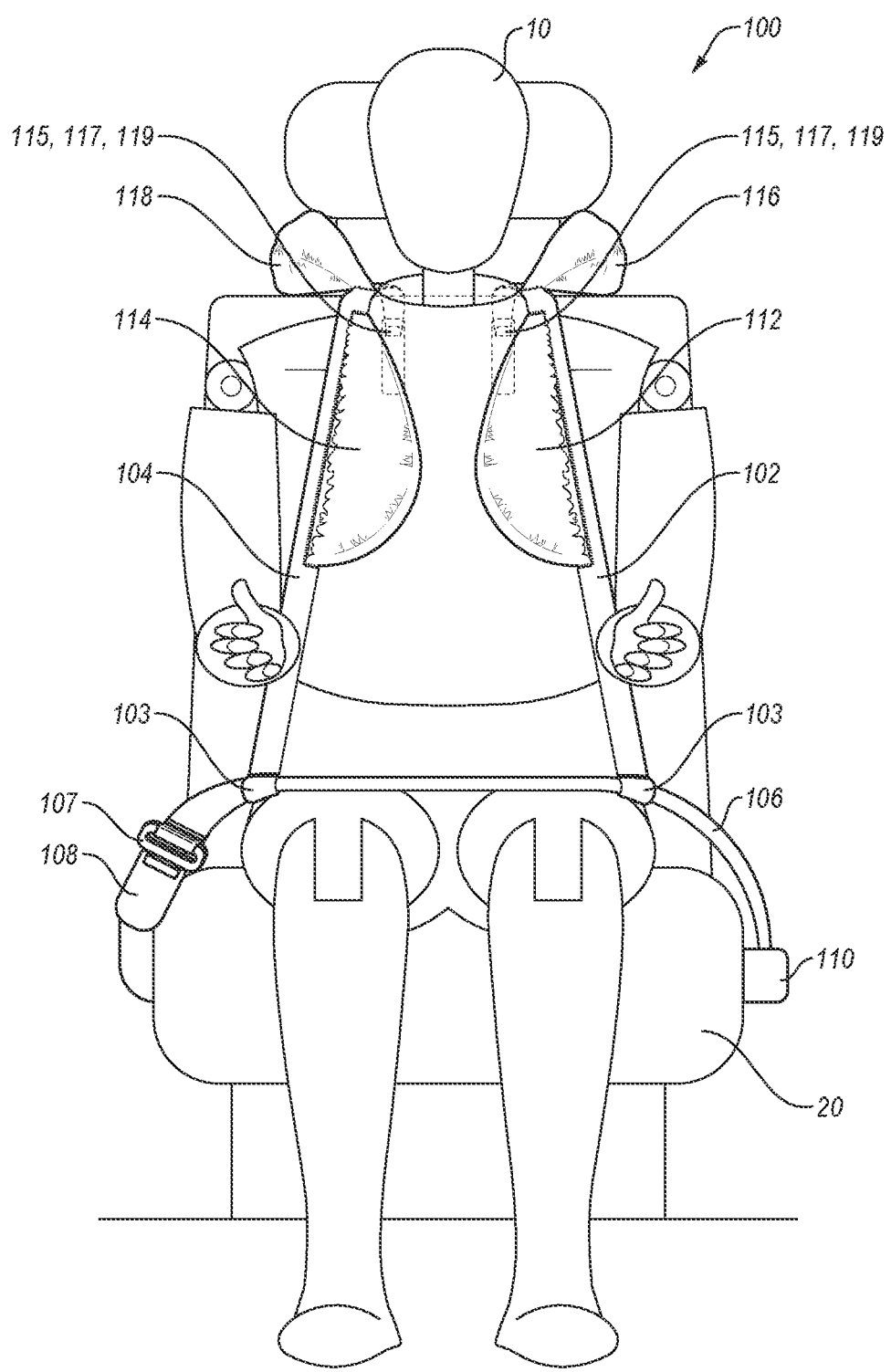
FIG. 2 illustrates the vehicle safety system of FIG. 1 following deployment.

Vertical seatbelts 102 and 104 further comprise one or more inflatable sections. These inflatable sections may be configured to deploy from within seatbelts 102 and 104 or, alternatively, may be positioned adjacent to seatbelts 102 and 104. Thus, in the depicted embodiment, the inflatable sections comprise tear seams 105 through which inflatable cushions may deploy. As shown in FIG. 2, seatbelt 102 comprises a first inflatable cushion 112 and seatbelt 104 comprises a second inflatable cushion 114.

Cushions 112 and 114 are configured to deploy adjacent to the chest region of occupant 10 and are preferably configured to engage the occupant's head and/or neck to prevent or at least inhibit forward movement of the occupant's head during an impact event. Thus, cushions 112 and 114 may serve a function similar to a HANS device. Although it is contemplated that, in some embodiments, cushions 112 and 114 may be configured to engage one another upon deployment, it may be preferred to maintain spacing between cushions 112 and 114 following deployment, as shown in FIG. 2, which may allow for centering of the occupant's head as it tilts forward into cushions 112 and 114 during, for example, a front end collision.

Preferably, the first inflatable cushion 112 and the second inflatable cushion 114 are configured to inflate at an at least substantially static location relative to an adjacent seat 20. To accomplish this, the vertical seatbelts 102 and 104 may be rigidly, or at least substantially rigidly rather than retractably, coupled with vehicle seat 20 at their respective top ends. Thus, system 100 further comprises a pair of respective anchor blocks 115 or another suitable anchor mechanism, each of which is configured to fixedly mount a respective vertical seatbelt 102/104. Anchor blocks 115 may be mounted to a top surface or rear upper surface, for example, of seat 20.

In preferred embodiments, anchor blocks 115 further comprise respective inflators 117 for inflating a respective cushion 112/114. These inflators 117 may be mounted directly to anchor blocks 115 in some embodiments. Of course, in other embodiments, a single inflator 117 may be used and/or such inflator or inflators 117 may be mounted elsewhere as desired. It should also be understood that, in some embodiments, anchor blocks 115 may comprise respective load limiting mechanisms 119 and/or pretensioners. This may allow seatbelts 102 and 104 to retract slightly during an impact event to provide sufficient spacing between the occupant 10 and the seatbelts 102/104 to allow for deployment of first inflatable cushion 112 and second inflatable cushion 114. Despite such mechanisms and limited retractions during deployment, for purposes of this disclosure, seatbelts 102 and 104 should be considered at least substantially rigidly coupled with seat 20 because of the lack of a standard retraction mechanism as would be provided elsewhere in system 100, as described below.

System 100 may comprise additional inflatable cushions that may deploy adjacent to the neck of occupant 10 and may be configured to inhibit lateral movement of the occupant's head during an impact event. For example, system 100 comprises a third inflatable cushion 116 and a fourth inflatable cushion 118, each of which is configured to deploy laterally of the head of occupant 10 between opposing sides of the occupant's head and the adjacent shoulder, which may be useful during oblique collisions. Like cushions 112 and 114, cushions 116 and 118 may deploy from tear seams or other weakened regions formed along seatbelts 102 and 104 or, alternatively, may be coupled to an outer surface of seatbelts 102/104 to deploy adjacent thereto. By providing both forward chest cushions and lateral head cushions, an occupant's head may be stabilized and protected in a variety of different types of impact events, which may be a useful supplement to traditional front and/or curtain airbag cushions.

The inflators used to inflate cushions 112 and 114 may also be used to inflate, respectively, cushions 116 and 118. Alternatively, additional inflators may be used if desired.

Figure 3:
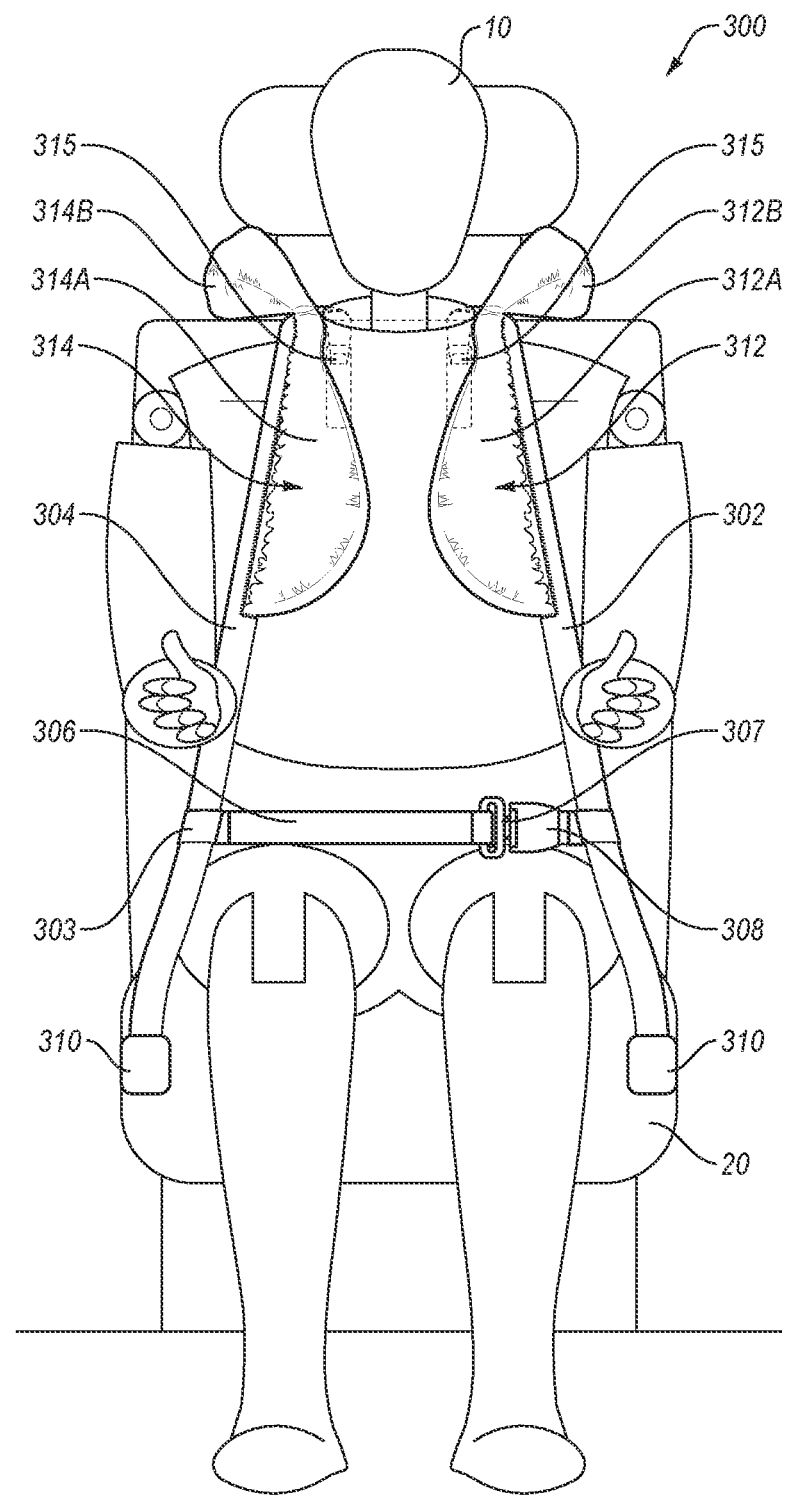
FIG. 3 illustrates an alternative embodiment of a vehicle safety system following deployment.

FIG. 3 illustrates a vehicle safety system 300 according to alternative embodiments following deployment. Vehicle safety system 300 comprises both seatbelt restraints and inflatable cushions. Thus, system 300 again comprises a first vertical seatbelt 302 and a second vertical seatbelt 304, along with a single horizontal or lap seatbelt 306.

Vertical seatbelts 302 and 304 are each retractably coupled to seat 20 at respective retractors 310, each of which is preferably configured to retract during use to accommodate a variety of different occupant sizes. Locating the retractors 310 on the seat may also better isolate system 300 from minor side impacts that may affect performance without damage or misalignment. This location for the retractors may also help with cost in development. For example, less vehicle sheet metal designs may be required, a more generic setup may be feasible (D-rings, anchors, pretensioners, and/or height adjusters may be reduced or eliminated), and/or may allow for improved occupant coverage/protection while requiring only a single latch point. Placement of the vertical seatbelts 302 and 304 on the outboard seat track may also provide for coverage of H-points while allowing the lap seatbelt 306 to also have good coverage.

Opposite retractors 310, vertical seatbelts 302 and 304 are preferably rigidly, rather than retractably, coupled to seat 20.

As previously mentioned, however, the upper end of seatbelts 302 and 304 may allow for slight movement during deployment yet should still be considered rigidly or fixedly coupled to seat 20 at these respective ends. Preferably, vertical seatbelts 302 and 304 are mounted inboard of the lower retractors 310 on the upper portion of seat 20.

Thus, system 300 may further comprise comprises a pair of respective anchor blocks 315, each of which is configured to fixedly mount a respective vertical seatbelt 302/304 to seat 20. As with system 100, in preferred embodiments, anchor blocks 315 comprise inflators, load limiting mechanisms, and/or pretensioners, as previously described in connection with system 100.

Horizontal seatbelt 306 is coupled with both of the vertical seatbelts 302 and 304. Unlike system 100, in system 300, horizontal seatbelt 306 is not directly coupled with a portion of seat 20. Instead, horizontal seatbelt 306 is coupled between vertical seatbelt 302 and vertical seatbelt 304. In some embodiments, one or both sides of horizontal seatbelt 306 may be slidably or otherwise movably coupled therebetween, such as by providing slidable clips 303, loops, or the like.

A buckle tongue 307 may be coupled at one end of horizontal seatbelt 306, the opposite end of which is coupled to vertical seatbelt 302, and a buckle 308 may be coupled to vertical seatbelt 304. In some embodiments, buckle 308 may be retractably coupled with the associated retraction mechanism 310, either in lieu of or in addition to making vertical seatbelt 304 retractably coupled thereto. Thus, the horizontal seatbelt 306 may be retractably coupled to at least one of the first vertical seatbelt 302 and the second vertical seatbelt 304 in some embodiments. In some embodiments, a latch mechanism for receiving buckle tongue 307 may therefore be slidable within vertical seatbelt 302 (or seatbelt 304).

As with system 100, vertical seatbelts 302 and 304 further comprise one or more inflatable sections, which may be configured to deploy from within seatbelts 302 and 304 or, alternatively, may be positioned adjacent thereto. In the depicted embodiment, the inflatable sections of vertical seatbelts 302 and 304 therefore comprise tear seams through which inflatable cushions may deploy. As shown in FIG. 3, seatbelt 302 comprises a first inflatable cushion 312 and seatbelt 304 comprises a second inflatable cushion 314.

Cushions 312 and 314 each comprises a chest portion and a shoulder/neck portion. Thus, cushion 312 comprises a chest portion 312A and a shoulder/neck portion 312B and, similarly, cushion 314 comprises a chest portion 314A and a shoulder/neck portion 314B. Chest portions 312A and 314A are configured to deploy adjacent to the chest region of occupant 10 and are configured to engage the occupant's head and/or neck during an impact event to prevent or at least inhibit forward movement of the occupant's head similar to a HANS device. Chest portions 312A and 314A may be configured to engage one another upon deployment or, alternatively, to maintain spacing therebetween following deployment, as shown in FIG. 3, which may allow for centering of the occupant's head as it tilts forward into chest portions 312A and 314A.

Thus, unlike system 100, system 300 comprises two cushions rather than four, but otherwise provides a similar function. Like system 100, however, preferably system 300 comprises cushions 312/314 that are configured to inflate at an at least substantially static location relative to an adjacent seat 20 by providing vertical seatbelts 302 and 304 that are fixedly anchored to seat 20 at their respective upper ends.

Figure 4:
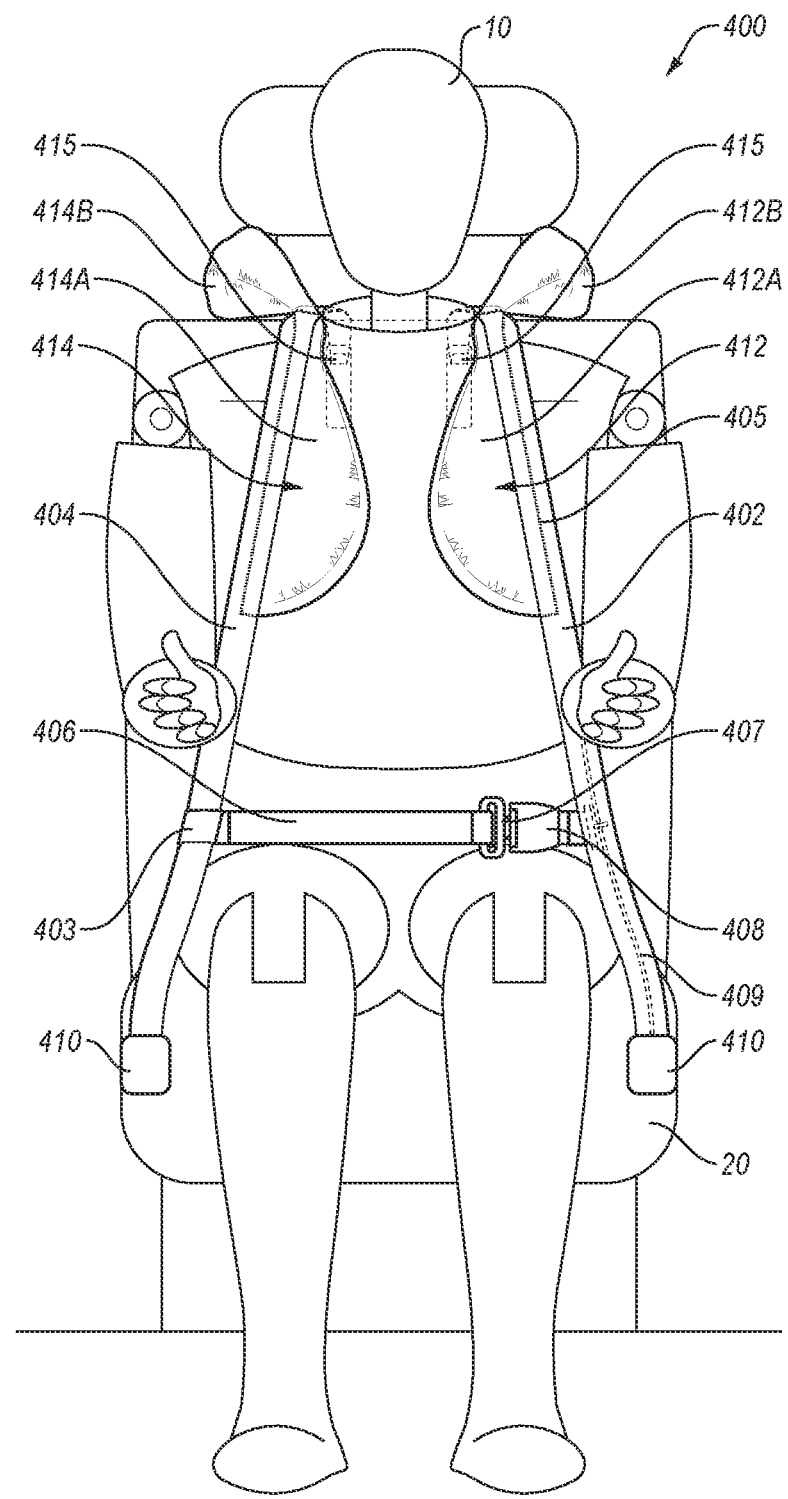
FIG. 4 illustrates a vehicle safety system following deployment according to still other embodiments.

FIG. 4 illustrates another vehicle safety system 400 according to still other embodiments. Vehicle safety system 400 comprises both seatbelt restraints and inflatable cushions, including a first vertical seatbelt 402 and a second vertical seatbelt 404, along with a single horizontal or lap seatbelt 406.

Vertical seatbelts 402 and 404 are each retractably coupled to seat 20 at respective retraction mechanisms 410, as previously described. Opposite retraction mechanism 410, vertical seatbelts 402 and 404 are preferably rigidly coupled to seat 20 at respective anchor blocks 415. As previously mentioned, the upper end of seatbelts 402 and 404 may allow for slight movement during deployment, such as by providing load limiting mechanisms and/or pretensioners, yet should still be considered rigidly or fixedly coupled to seat 20 at these respective ends for purposes of this disclosure.

Again, any number of inflators may be used, as those of ordinary skill in the art will appreciate. However, in preferred embodiments, anchor blocks 415 each comprises a separate inflator mounted thereto, in some cases along with a suitable pretensioner and/or load limiting mechanism. Thus, a single inflator may be used to inflate both inflatable sections of each vertical seatbelt 402 and 404, in some cases through one or more tear seams 405 or other frangible elements. More specifically, seatbelt 402, like seatbelt 302, comprises a first inflatable cushion 412 and seatbelt 404, like seatbelt 304, comprises a second inflatable cushion 414.

In addition, cushions 412 and 414 each comprises a chest portion and a shoulder/neck portion. Thus, cushion 412 comprises a chest portion 412A and a shoulder/neck portion 412B and, similarly, cushion 414 comprises a chest portion 414A and a shoulder/neck portion 414B. Chest portions 412A and 414A are configured to deploy adjacent to the chest region of occupant 10 and are configured to engage the occupant's head and/or neck during an impact event to prevent or at least inhibit forward movement of the occupant's head similar to a HANS device. Chest portions 412A and 414A may be configured to engage one another upon deployment or, alternatively, to maintain spacing therebetween following deployment, as shown in FIG. 4, which may allow for centering of the occupant's head as it tilts forward into chest portions 412A and 414A.

However, unlike the systems depicted in previous embodiments, system 400 comprises cushions having chest portions 412A/414A that are configured to deploy below instead of above respective seatbelts 402 and 404. Like system 300, however, preferably system 400 comprises cushions 412/414, including both of the aforementioned inflatable sections, that are configured to inflate at an at least substantially static location relative to an adjacent seat 20 by providing vertical seatbelts 402 and 404 that are fixedly anchored to seat 20 at their respective upper ends. Of course, in alternative embodiments, the inflatable sections may be separated into separate cushions, each of which may be inflated using the same inflator or separate inflators.

Horizontal seatbelt 406 is coupled with both of the vertical seatbelts 402 and 404. Like system 300, horizontal seatbelt 406 is not directly coupled with a portion of seat 20. Instead, horizontal seatbelt 406 is coupled between vertical seatbelt 402 and vertical seatbelt 404. In some embodiments, one or both sides of horizontal seatbelt 406 may be slidably or otherwise movably coupled therebetween, such as by providing slidable clips 403, loops, or the like.

A buckle tongue 407 may be coupled at one end of horizontal seatbelt 406, the opposite end of which is coupled to vertical seatbelt 402, and a buckle 408 may be coupled to vertical seatbelt 404. However, rather than extending from the opposing vertical seatbelt, in system 400, buckle 408 is incorporated into vertical seatbelt 402 itself and may comprise a retractable cable or another retractable member 409 that may extend within seatbelt 404 into its adjacent retraction mechanism 410. Thus, horizontal seatbelt 406 is retractably coupled to vertical seatbelt 404.

The foregoing specification has been described with reference to various embodiments and implementations. However, one of ordinary skill in the art will appreciate that various modifications and changes can be made without departing from the scope of the present disclosure. For example, various operational steps, as well as components for carrying out operational steps, may be implemented in various ways depending upon the particular application or in consideration of any number of cost functions associated with the operation of the system. Accordingly, any one or more of the steps may be deleted, modified, or combined with other steps. Further, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced, are not to be construed as a critical, a required, or an essential feature or element.

Those having skill in the art will appreciate that many changes may be made to the details of the above-described embodiments without departing from the underlying principles of the invention. The scope of the present invention should, therefore, be determined only by the following claims.

The invention claimed is:

1. A vehicle safety system, comprising:
   a first vertical seatbelt non-retractably coupled with an adjacent seat at an upper end of the first vertical seatbelt;
   a first inflatable cushion coupled with the first vertical seatbelt;
   a second vertical seatbelt non-retractably coupled with the adjacent seat at an upper end of the second vertical seatbelt;
   a second inflatable cushion coupled with the second vertical seatbelt,
      wherein the first inflatable cushion and the second inflatable cushion are configured to be positioned and inflated at an at least substantially static location relative to the adjacent seat, and
      wherein the first inflatable cushion and the second inflatable cushion are configured to deploy adjacent to an occupant's chest and to inhibit movement of an occupant's head during an impact event; and
   a horizontal seatbelt coupled with at least one of the first vertical seatbelt and the second vertical seatbelt, wherein the horizontal seatbelt is retractably coupled to at least one of the first vertical seatbelt and the second vertical seatbelt.

2. The vehicle safety system of claim 1, wherein at least one of the first vertical seatbelt and the second vertical seatbelt is configured to retract from a bottom portion thereof.

3. The vehicle safety system of claim 2, wherein both of the first vertical seatbelt and the second vertical seatbelt are configured to retract from a bottom portion thereof.

4. The vehicle safety system of claim 1, wherein the horizontal seatbelt is coupled with both the first vertical seatbelt and the second vertical seatbelt.

5. The vehicle safety system of claim 1, further comprising a third inflatable cushion configured to inflate adjacent to the occupant's neck and to inhibit lateral movement of the occupant's head during an impact event.

6. The vehicle safety system of claim 5, further comprising a fourth inflatable cushion configured to inflate adjacent to the occupant's neck on a side of the occupant's neck opposite from the third inflatable cushion and to inhibit lateral movement of the occupant's head during an impact event.

7. The vehicle safety system of claim 1, wherein at least one of the first vertical seatbelt and the second vertical seatbelt comprises a latch mechanism for receiving a tongue of the horizontal seatbelt.

8. The vehicle safety system of claim 7, wherein the latch mechanism is slidable within the at least one of the first vertical seatbelt and the second vertical seatbelt.

9. A vehicle safety system, comprising:
   a first vertical seatbelt;
   a second vertical seatbelt;
   a horizontal seatbelt coupled with at least one of the first vertical seatbelt and the second vertical seatbelt;
   a first inflatable cushion directly coupled with at least one of the first vertical seatbelt and the second vertical seatbelt, wherein the first inflatable cushion is configured to deploy adjacent to an occupant's chest and to contact at least one of the occupant's head and neck to inhibit forward movement of the occupant's head relative to the occupant's body during an impact event; and
   a second inflatable cushion directly coupled with the at least one of the first vertical seatbelt and the second vertical seatbelt, wherein the second inflatable cushion is configured to deploy adjacent to the occupant's neck and to inhibit lateral movement of the occupant's head during an impact event.

10. The vehicle safety system of claim 9, wherein the first inflatable cushion is coupled with the first vertical seatbelt, and further comprising a third inflatable cushion coupled with the second vertical seatbelt, wherein the third inflatable cushion is configured to deploy adjacent to the occupant's chest on a side of the occupant's chest opposite from the first inflatable cushion.

11. The vehicle safety system of claim 10, wherein the second inflatable cushion is coupled with the first vertical seatbelt, and further comprising a fourth inflatable cushion coupled with the second vertical seatbelt, wherein the fourth inflatable cushion is configured to deploy adjacent to the occupant's neck on a side of the occupant's neck opposite from the second inflatable cushion.

12. The vehicle safety system of claim 9, further comprising:
   a first anchor mechanism coupled to the first vertical seatbelt and configured to be coupled to a vehicle seat; and
   a second anchor mechanism coupled to the second vertical seatbelt and configured to be coupled to the vehicle seat.

13. The vehicle safety system of claim 12, wherein both the first anchor mechanism and the second anchor mechanism comprise a load limiter configured to allow the first vertical seatbelt and the second vertical seatbelt to extend from their respective anchor mechanisms during an impact event.

14. A vehicle, comprising:
   a seat;

a first vertical seatbelt non-retractably anchored to an upper portion of the seat such that the first vertical seatbelt lacks a retraction mechanism at the upper portion of the seat;
a second vertical seatbelt non-retractably anchored to the upper portion of the seat such that the second vertical seatbelt lacks a retraction mechanism at the upper portion of the seat, wherein at least one of the first vertical seatbelt and the second vertical seatbelt is retractably coupled to the seat at a lower portion of the seat;
a lap seatbelt coupled with at least one of the first vertical seatbelt and the second vertical seatbelt;
a first inflator operably coupled with the first vertical seatbelt;
a first inflatable cushion configured to deploy from the first vertical seatbelt;
a second inflator operably coupled with the second vertical seatbelt; and
a second inflatable cushion configured to deploy from the second vertical seatbelt.

15. The vehicle of claim 14, wherein both the first vertical seatbelt and the second vertical seatbelt are retractably coupled to the seat at respective lower portions of the seat.

16. The vehicle of claim 15, further comprising:
a first load limiting mechanism coupled with the first vertical seatbelt and configured to allow the first vertical seatbelt to extend from a first anchor point at which the first vertical seatbelt is anchored to the upper portion of the seat during an impact event; and
a second load limiting mechanism coupled with the second vertical seatbelt and configured to allow the second vertical seatbelt to extend from a second anchor point at which the second vertical seatbelt is anchored to the upper portion of the seat during an impact event.

17. The vehicle of claim 16, wherein the first inflator is coupled with the first load limiting mechanism, and wherein the second inflator is coupled with the second load limiting mechanism.

18. The vehicle of claim 14, wherein both the first vertical seatbelt and the second vertical seatbelt are non-releasably coupled at both opposing ends to the seat such that no manual coupling or recoupling of the first vertical seatbelt or the second vertical seatbelt is required during use.

19. The vehicle of claim 14, further comprising:
a third inflatable cushion coupled with the first vertical seatbelt, wherein the third inflatable cushion is configured to deploy adjacent to a neck of an occupant in the seat and to inhibit lateral movement of the occupant's head during an impact event; and
a fourth inflatable cushion coupled with the second vertical seatbelt, wherein the fourth inflatable cushion is configured to deploy adjacent to the occupant's neck on a side of the occupant's neck opposite from the third inflatable cushion and to inhibit lateral movement of the occupant's head during an impact event.

* * * * *